Jan. 7, 1964 F. J. RUSSELL 3,116,775
THREADED MEMBER WITH DEFLECTING BAND ANTI-LOOSENING DEVICE
Filed Oct. 3, 1960
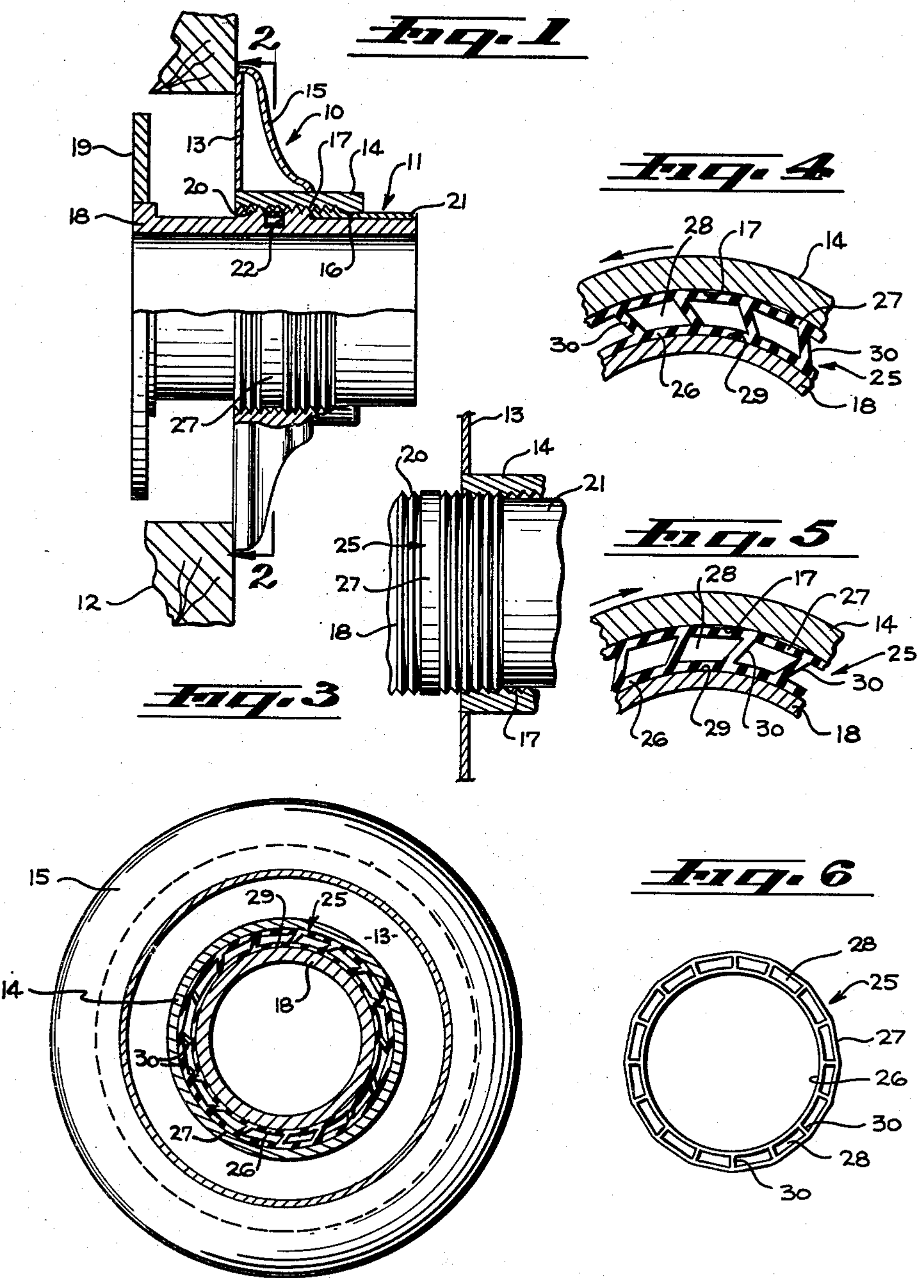
FRED J. RUSSELL
INVENTOR.
BY
Beehler & Shanahan.
ATTORNEYS United States Patent Office 3,116,775

Patented Jan. 7, 1964

3,116,775

THREADED MEMBER WITH DEFLECTING BAND ANTI-LOOSENING DEVICE

Fred J. Russell, 3800 Don Felipe Drive, Los Angeles, Calif.

Filed Oct. 3, 1960, Ser. No. 59,892
1 Claim. (Cl. 151—25)

The invention relates to a device for inhibiting the rotation of one screw-threaded element with respect to another after the elements have been rotated one with respect to the other to a tightened condition. Although the device is especially applicable to the retention of elements of a door lock, it is also generally useful in connection with the engagement of screw-threaded elements under circumstances where during threading engagement and also during unthreading it is desirable to be able to rotate the threaded elements with respect to each other without encountering an unnecessarily great amount of resistance.

In certin types of door locks heretofore in general use, the practice has been to provide a threaded engagement between the exterior portion of a relatively stationary sleeve-like element and the interior of a rose or escutcheon assembly in order to permit the rose or escutcheon assembly to be tightened against the surface of the door irrespective of whether the lock device might be used upon a relatively thin door or a relatively thick door. In devices of the kind made reference to, use has been made in the past of a resilient friction-creating device positioned in a recess in the exteriorly threaded element having flexible fingers extending outwardly so as to engage the corners of the threads of the interiorly threaded elements when the threaded elements are rotated with respect to each other.

Although devices of the type referred to have encountered some degree of acceptance in that they do prevent loosening of one part with respect to the other, they have had certain drawbacks among which has been the tendency of the corners of the threads to cut into and cut away the portions of the resilient element until after relatively few uses the anti-loosening device no longer serves as an effective means for preventing the loosening of the threaded elements.

In the case of other anti-loosening devices such, for example, as nuts or screws having plastic inserts or nuts, for example, distorted into a non-circular shape, thereby to provide a resistance to the threaded engagement of one member with respect to the other, the resistance is always present during both threading and unthreading and hence both the threading operation and unthreading operation is objectionably time-consuming and requires the use of wrenches. Further still, many types of devices of the last-mentioned variety do not lend themselves to repeated reuse.

It is therefore among the objects of the invention to provide a new and improved anti-loosening device which can be easily installed and removed when needed but which, once in place, supplies substantially adequate resistance to loosening to the extent that the parts will remain firmly in place unless the loosening is deliberately started for the purpose of separating the parts.

Another object of the invention is to provide a new and improved friction-generating band to prevent the loosening of mutually engaging threaded devices which is possessed of a better wearing surface over areas which engage corners of the threads, which permits engagement of the threaded elements with relative ease, and which is especially resistant to reverse rotation once the threaded elements are tightened properly in position.

Still another object of the invention is to provide a friction-generating anti-loosening device for futually rotating threaded elements which, although highly resistant to reverse rotation once the elements are tightened in position, nevertheless permits relatively easy mutual rotation between the parts, both during tightening and during separation, the greatest force being applicable at the instant of reversal of direction, thereby to provide a maximum amount of anti-loosening action.

With these and other objects in view, the invention consists in the construction, arrangement and combination of the various parts of the device, whereby the objects contemplated are attained, as hereinafter set forth, pointed out in the appended claim and illustrated in the accompanying drawings.

In the drawings:

FIGURE 1 is a longitudinal sectional view of a screw-threaded assembly showing mutually engaging screw-threaded elements in a position of engagement.

FIGURE 2 is a cross-sectional view taken on the line 2—2 of FIGURE 1.

FIGURE 3 is a fragmentary longitudinal sectional view of the parts illustrated in FIGURE 1 showing the relationship of the parts immediately prior to engagement with the anti-loosening device.

FIGURE 4 is a fragmentary cross-sectional view showing the condition of the anti-loosening device during unscrewing of the elements.

FIGURE 5 is a view similar to FIGURE 4 showing the condition of the anti-loosening device while the elements are being engaged.

FIGURE 6 is a plan view of the anti-loosening device in expanded condition.

In an embodiment of the invention chosen for the purpose of illustration the parts selected comprise an escutcheon or rose assembly 10 applied to a hub assembly 11 for attachment to a door 12. The escutcheon assembly and hub assembly may be construed as a screw assembly wherein the parts present inside and outside threaded elements. More particularly, the escutcheon assembly comprises a mounting plate 13 having a collar 14 fastened thereto and around which is a decorative rosette 15. The collar has an opening 16 therethrough and threads 17 extending throughout a substantial portion of the opening 16.

The hub assembly, at least for the purpose of description herein, comprises a hub 18 which may, for example, be attached to a portion of a frame 19, the hub being provided with exterior threads 20 throughout a substantial portion of its length and having, if desired, a decorative sleeve 21 at the outside end.

In the chosen embodiment the hub is selected as the threaded element in which is formed an annular recess 22, although it will be appreciated that if need be the recess could be formed on the inside surface of the collar 14. The recess has a depth greater than the depth of the threads 20 and a breadth somewhat greater than the pitch of the threads, namely, the distance between adjacent corners or apexes at the top of successive turns of the thread.

The anti-loosening device shown in plan view in FIGURE 6 and identified with the reference character 25 is constructed of resilient material of such character as presents a friction-generating surface such, for example, as certain types of natural and synthetic rubber. The anti-loosening device includes an inner band 26 and an outer band 27. The bands are of different diameter and provide a space 28 therebetween. From an examination of FIGURES 1, 4 and 5 it will be noted that the diameter of the inner band 26 is substantially the same as the diameter of the innermost circumference 29 of the recess 22. The outside diameter of the outer band 27, as observable in FIGURE 3, is approximately the same as the outside diameter of the recess 22 which is roughly the equivalent of the major diameter of the threads 20.

In the space 28 are provided a multiple number of circumferentially spaced radially extending spokes 30 which connect at inner ends to the inner band 26 and at outer ends to the outer band 27. In the chosen embodiment the spokes are integral with and comprise the same material as the inner and outer bands. The essential character of the spokes 30 is that this means interconnecting outer and inner bands be such as to supply relatively great resistance against radial compression but relatively light resistance to flexure in a substantially circumferential direction during either left-hand or right-hand rotation as suggested in FIGURES 4 and 5.

When the anti-loosening device is to be used, it is placed in the recess 22 substantially as shown in FIGURE 3. In this position the exterior of the outer band will lie more or less even with the apexes of the threads 20. Moreover, the outside surface of the outer band is relatively wide and smooth and, of course, extends continuously throughout the entire circumference. This may be perfectly circular or may dip slightly as the outer band bridges between adjacent spokes 30.

The collar then is rotated with the threads 17 in engagement with the threads 20 until the threads 17 engage the outside circumference of the outer band 27. Rotation in the direction suggested is illustrated in FIGURE 5. When the threads 17 actually engage the anti-loosening device, the outer band 27 will be shifted circumferentially in a clockwise direction, as viewed in FIGURES 2 and 5, and this will tend to flex the spokes 30 in the direction shown in these figures. The spokes flex with relative ease and the outer band 27 compressed slightly so as to dip between the spokes readily permits a free rotation of the collar 17 with respect to the hub 18 until the escutcheon assembly 10 is forced against the adjacent surface of the door 12. This is tightened condition for the parts as illustrated in FIGURES 1 and 2.

When there is a tendency to loosen which would occur from a reverse or counter-clockwise rotation of the collar 14 with respect to the hub 18, friction existing between the exterior surface of the outer band 27 and the threads 17 coupled with the tendency of the spokes 30 to straighten from the position of FIGURES 2 and 5, supplies a maximum resistance to rotation. This is due in part to the fact that the spokes have relatively great resistance to compression as columns in a somewhat radial direction. Although the resilient material of the anti-loosening device is capable of relatively easy flexure, it is relatively resistant to compression. Hence, at the moment of reversal from the direction of rotation of FIGURE 5 to the direction of rotation of FIGURE 4, the greatest resistance will be supplied.

The resistance mentioned, however, is capable of being overcome and once the spokes are flexed in a reverse direction to the direction shown in FIGURE 4, the collar can be loosened with relative ease as it is rotated with respect to the hub 18. Of marked advantage in the device herein disclosed is the fact that all of the spokes

30 are interconnected both at the outside ends and the inside ends by the outer and inner bands, respectively, so that all of the spokes act simultaneously, each supplying its own individual resistance to rotation at the moment of reversal of rotation. Hence the structure, though simple, supplies a maximum resistance at the above described moment to prevent loosening of the screw-threaded elements as described.

While the invention has herein been shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices.

Having described the invention, what is claimed as new in support of Letters Patent is:

An anti-loosening device for a screw assembly comprising mutually engaging outside and inside screw threaded elements wherein one screw threaded element has an annular recess having a depth greater than the depth of its threads, and a width in an axial direction greater than the pitch of said threads, said device being in said recess, said device being formed of a resilient material and comprising a first annular band of rubber-like material having a diameter approximating the diameter of the innermost circumference of said annular recess and in engagement with the innermost circumference of said recess, a second annular band of rubber-like material having a diameter approximately the same as the diamteer of the crest of its threads, said second band having a width in an axial direction greater than the pitch of said threads, said bands having a space therebetween, and a multiple number of circumferentially spaced radially extending spokes of said rubber-like material in said space having inner and outer ends connected respectively to said bands, said spokes being compressible in a radial direction at a location intermediate to said first and second annular bands and having a resistance to compression in a radial direction greater than resistance to deflection in a generally circumferential direction, said spokes having open spaces therebetween and when deflected generally in one direction in response to mutual rotation of said screw threaded elements being resistant to crippling and flexure in an opposite direction upon reverse rotation of said screw threaded elements whereby to inhibit loosening of said screw threaded elements but without barring reverse rotation.

References Cited in the file of this patent

UNITED STATES PATENTS

| | | |
|---|---|---|
| 1,791,017 | Sundh | Feb. 3, 1931 |
| 2,803,324 | Dodge | Aug. 20, 1957 |
| 2,881,819 | Devaux | Apr. 14, 1959 |
| 2,886,089 | Schlage | May 12, 1959 |

FOREIGN PATENTS

| | | |
|---|---|---|
| 79,904 | Sweden | Feb. 27, 1933 |